United States Patent
Lord

(10) Patent No.: US 7,280,133 B2
(45) Date of Patent: Oct. 9, 2007

(54) SYSTEM AND METHOD FOR QUEUING AND PRESENTING AUDIO MESSAGES

(75) Inventor: William Palmer Lord, Fishkill, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 787 days.

(21) Appl. No.: 10/177,684

(22) Filed: Jun. 21, 2002

(65) Prior Publication Data

US 2003/0235407 A1    Dec. 25, 2003

(51) Int. Cl.
*H04N 7/14* (2006.01)

(52) U.S. Cl. .............. 348/14.01; 348/14.03; 725/34

(58) Field of Classification Search .. 348/14.01–14.09; 725/1, 34, 37, 106, 131, 133, 32, 110, 118
See application file for complete search history.

(56) References Cited

U.S. PATENT DOCUMENTS

| 5,414,817 | A | * | 5/1995 | Ezzet et al. ................ 710/17 |
| RE34,976 | E | * | 6/1995 | Helferich et al. ......... 379/88.1 |
| 5,953,049 | A | | 9/1999 | Horn et al. ................ 348/15 |
| 2002/0016960 | A1 | | 2/2002 | Yamato ..................... 725/1 |
| 2003/0226143 | A1 | * | 12/2003 | Michael et al. ............ 725/32 |

FOREIGN PATENT DOCUMENTS

| EP | 0659006 A2 | 6/1995 |
| EP | 1111926 A2 | 6/2001 |
| EP | 1119192 A2 | 7/2001 |
| WO | 0013416 A1 | 3/2000 |
| WO | 0039978 A2 | 7/2000 |
| WO | 0044173 A1 | 7/2000 |

OTHER PUBLICATIONS

Bang; Synchtonization of Audio and video signals; Mar. 21, 2002; WO 02/23916 A1.*
US010306, U.S. Appl. No. 09/894,060, filed Jun. 28, 2001.

* cited by examiner

Primary Examiner—Melur Ramakrishnaiah
(74) Attorney, Agent, or Firm—Eric M. Bram

(57) ABSTRACT

A system and method is disclosed for queuing and presenting audio messages in a communication system comprising an audio controller and audio message computer software. The audio controller receives overlapping audio messages that have portions that have been simultaneously received by the audio controller. The audio controller separately stores the audio messages in a queue in an audio buffer and then sequentially plays the messages. The audio controller may delay playing an audio message for a predetermined period of time or until the audio controller receives a control signal from a user. The user may select an audio message to be played from a list that displays the names of the senders of the audio messages. The audio controller may obtain a timestamp from a video program and associate an audio message to be played with the video program.

24 Claims, 8 Drawing Sheets

SYSTEM AND METHOD FOR QUEUING AND PRESENTING AUDIO MESSAGES

CROSS-REFERENCE TO RELATED APPLICATION

The present invention is related to the invention disclosed in U.S. patent application Ser. No. 09/894,060 filed on Jun. 28, 2001, entitled "SYNCHRONIZED PERSONAL VIDEO RECORDERS." This patent application is commonly assigned to the assignee of the present invention. The disclosure of this related patent application is hereby incorporated herein by reference for all purposes as if fully set forth herein.

TECHNICAL FIELD OF THE INVENTION

The present invention is directed in general to communication systems, and more particularly, to a system and method in a video display system for queuing and presenting audio messages.

BACKGROUND OF THE INVENTION

A wide variety of video playback devices are available in the marketplace. Most people own, or are familiar with, a video cassette recorder (VCR). A video tape recorder (VTR) is another type of video playback device. More recently, video recorders that use computer magnetic hard disks rather than magnetic cassette tapes to store video programs have appeared in the market. For example, the ReplayTVJ recorder and the TiVOJ recorder digitally record television programs on hard disk drives using, for example, MPEG-2 compression. Additionally, some video playback devices may record on a readable/writable digital versatile disk (DVD) rather than a magnetic disk.

Some video playback devices now on the market have computer processing capabilities similar to that of a personal computer. In addition, some video playback devices have communications systems that allow users to send audio messages to other users who are also viewing video programs on similar video playback devices. For example, such a system is described in U.S. patent application Ser. No. 09/010,306 filed on Jun. 28, 2001, entitled "SYNCHRONIZED PERSONAL VIDEO RECORDERS."

These types of video playback devices allow users to communicate while the users are simultaneously watching the same video program. All of the users are in communication with each other. When the communication between the users is in the form of text messages there is no conflict because the system prints out each message separately.

When the communication between the users is in the form of audio messages, however, there will be a conflict when two or more audio messages arrive at the same time (or nearly the same time) so that parts of the audio messages are received simultaneously. When such audio messages are presented through a speaker the resulting presentation sounds as if the persons are speaking at the same time.

There is therefore a need in the art for a communication system and method that is capable of queuing and presenting audio messages. There is also a need in the art for a communication system and method that sequentially presents two or more audio messages that have overlapping portions that have been received simultaneously by an audio receiver.

SUMMARY OF THE INVENTION

To address the above-discussed deficiencies of the prior art, it is a primary object of the present invention to provide, for use in a communication system such as a video display system capable of displaying a video program, a system and method for queuing and presenting audio messages.

The present invention comprises an audio controller and audio message computer software. The audio controller may receive overlapping audio messages that have portions that have been simultaneously received by the audio controller. If the overlapping audio messages are played as received, the effect is as if two persons are talking at the same time. In order to separate the two overlapping messages, the audio controller separately stores the overlapping audio messages in a "first in, first out" queue in an audio buffer. The audio controller then sequentially plays the messages.

The audio controller may delay playing an audio message for a predetermined period of time. This provides a time delay between each audio message. Alternatively, the audio controller may delay playing an audio message until the audio controller receives a control signal from a user. In one advantageous embodiment of the invention, the audio controller displays a list of names of the senders of the audio messages. The user may then select an audio message to be played by selecting a name of a sender from the list. This allows the user to select the order in which the audio messages are played.

In another advantageous embodiment of the invention, the audio controller may receive an audio message from a first user to be sent to a second user in which the audio message relates to a video program that the first user and the second user are watching simultaneously. When the audio controller of the first user records the audio message the audio controller accesses a video unit to obtain a timestamp from a video program at the time the audio message was recorded. The audio controller associates the audio message and the timestamp information. The audio controller then sends the audio message and the timestamp information to the second user. The audio controller of the second user can then use the timestamp information to access the relevant portion of the video program and play the audio message and at the same time display the relevant portion of the video program.

According to an advantageous embodiment of the present invention, the audio controller receives a plurality of overlapping audio messages and separately stores the plurality of overlapping audio messages in an audio buffer. The audio controller then sequentially plays each of the separately stored overlapping audio messages.

According to an advantageous embodiment of the present invention, the audio controller is capable of storing the plurality of overlapping audio messages in a "first in, first out" queue in the audio buffer.

According to an advantageous embodiment of the present invention, the audio controller is capable of waiting for a period of time before playing an audio message that is stored in the audio buffer.

According to another advantageous embodiment of the present invention, the audio controller is capable of receiving a control signal from a user before the audio controller plays an audio message that is stored in the audio buffer.

According to another advantageous embodiment of the present invention, the audio controller is capable of receiving a control signal from a user that indicates an audio message to be played next.

According to still another advantageous embodiment of the present invention, the audio controller is capable of associating an audio message from a first user with a timestamp of a portion of a video program and sending the audio message and timestamp information to a second user.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a television receiver and a television broadcast system. However, this embodiment is by way of example only and should not be construed to limit the scope of the present invention to television receivers and to television broadcast systems. In fact, those skilled in the art will recognize that the exemplary embodiment of the present invention may easily be modified for use in any type of video display system and video broadcast system.

Figure 1:
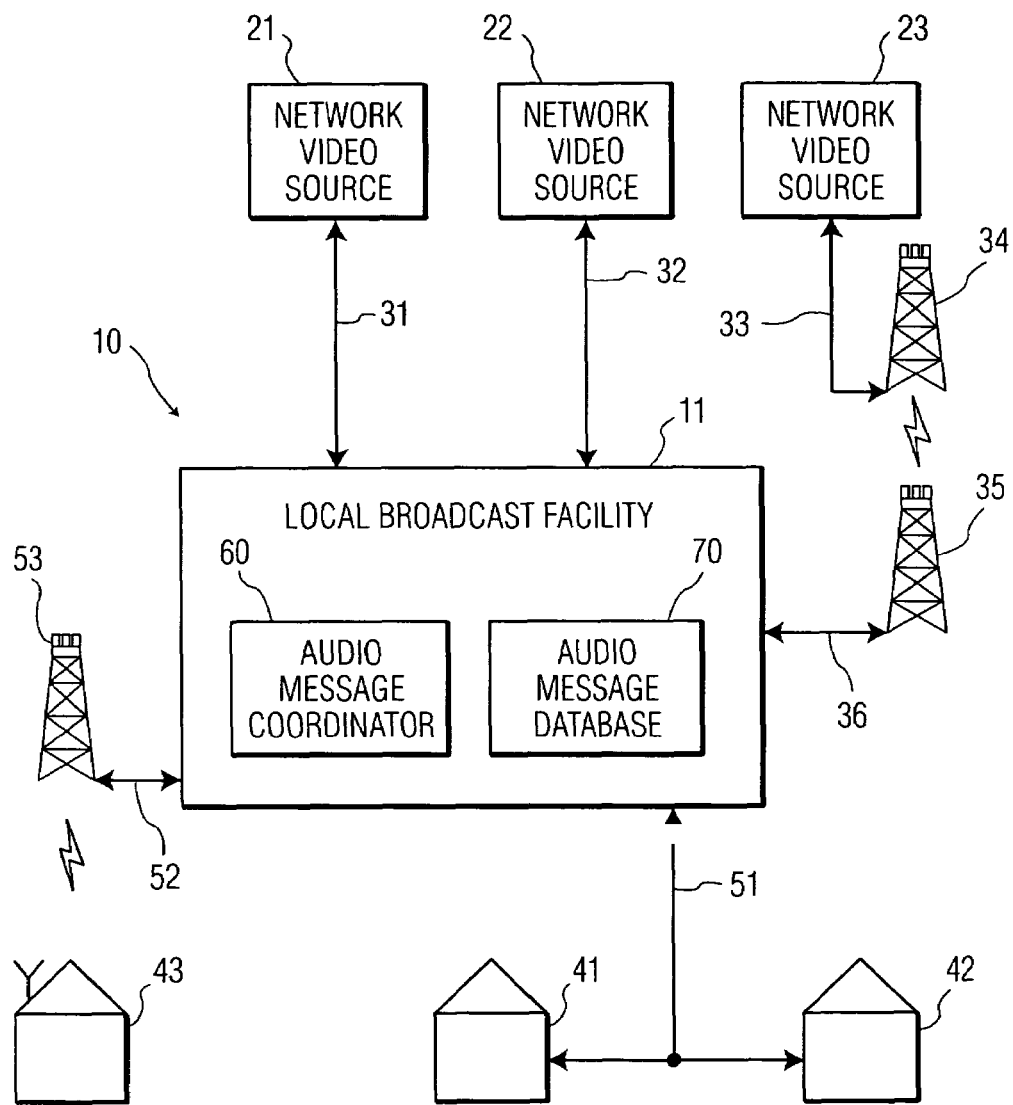
FIG. 1 illustrates an exemplary television broadcast system according to an advantageous embodiment of the present invention.

FIG. 1 illustrates exemplary television broadcast system 10 according to an advantageous embodiment of the present invention. Television broadcast system 10 comprises local broadcast facility 11. Local broadcast system 11 receives one or more digital video transport streams from network video source 21, from network video source 22, and from network video source 23. Local broadcast facility 11 may receive these digital video transport streams from wireline communication links or from wireless communication links. For example, local broadcast facility 11 receives one or more digital video transport streams from network video source 21 via wireline communication link 31 and receives one or more digital video transport streams from network video source 22 via wireline communication link 32.

Local broadcast facility 11 also comprises base transceiver station 34 and base transceiver station 35 which wirelessly transmit one or more digital video transport streams from network video source 23 to local broadcast facility 11. In an exemplary embodiment, network video source 23 may transmit the digital video transport streams via communication line 33 to base transceiver station 34 which is a part of a local multipoint distribution system (LMDS) network. In an LMDS network, a microwave link is used to transmit the digital video transport streams from base transceiver station 34 to base transceiver station 35. Communication line 36 carries the digital video transport streams from base transceiver station 35 to local broadcast facility 11.

Local broadcast facility 11 transmits the digital video transport streams to subscriber locations 41, 42 and 43, which may include both private residences and business locations. If local broadcast facility 11 is part of a cable television system, local broadcast facility 11 may transmit one or more outbound digital video transport streams to subscriber locations 41 and 42 via communication wireline 51. Communication wireline 52 carries one or more outbound digital video transport streams from local broadcast facility 11 to transmitter 53, which wirelessly transmits the outbound digital signal video transport streams to subscriber location 43.

Each of the digital video transport streams received by and transmitted by local broadcast facility 11 is carried in a six megahertz (6 MHz) broadcast channel. A transport stream usually contains several virtual channels, with each virtual channel containing a program. The program carried in a virtual channel is what a viewer sees on a single television channel, such as a movie, a newscast, and a weather channel. Normally, each virtual channel is allocated a fixed bandwidth such as three megabits per second (3 Mbps).

Local broadcast facility 11 also comprises audio message coordinator 60 and audio message database 70. Audio message coordinator 60 communicates bidirectionally with associated audio controllers in video playback devices in subscriber locations in order to receive audio messages from each user and to distribute audio messages to each user. User information for each user is stored in audio message database 70.

Those skilled in the art will understand that the use of local broadcast facility 11 to control the audio messaging is by way of example only and should not be construed so as to limit the scope of the present invention. For example, in another advantageous embodiment of the present invention, the audio messaging may be controlled out of band through an Internet connection.

In the descriptions of the present invention that follow, the associated audio controller that communicates bidirectionally with audio message coordinator 60 is implemented in a video playback device comprising a disk-based video recorder. Those skilled in the art will understand that this is by way of example only and should not be construed so as to limit the scope of the present invention. In alternate advantageous embodiments of the present invention, the audio controller may be implemented in a television set, in a conventional video cassette recorder (VCR), in a cable television converter box, or in a satellite dish control box.

Figure 2:
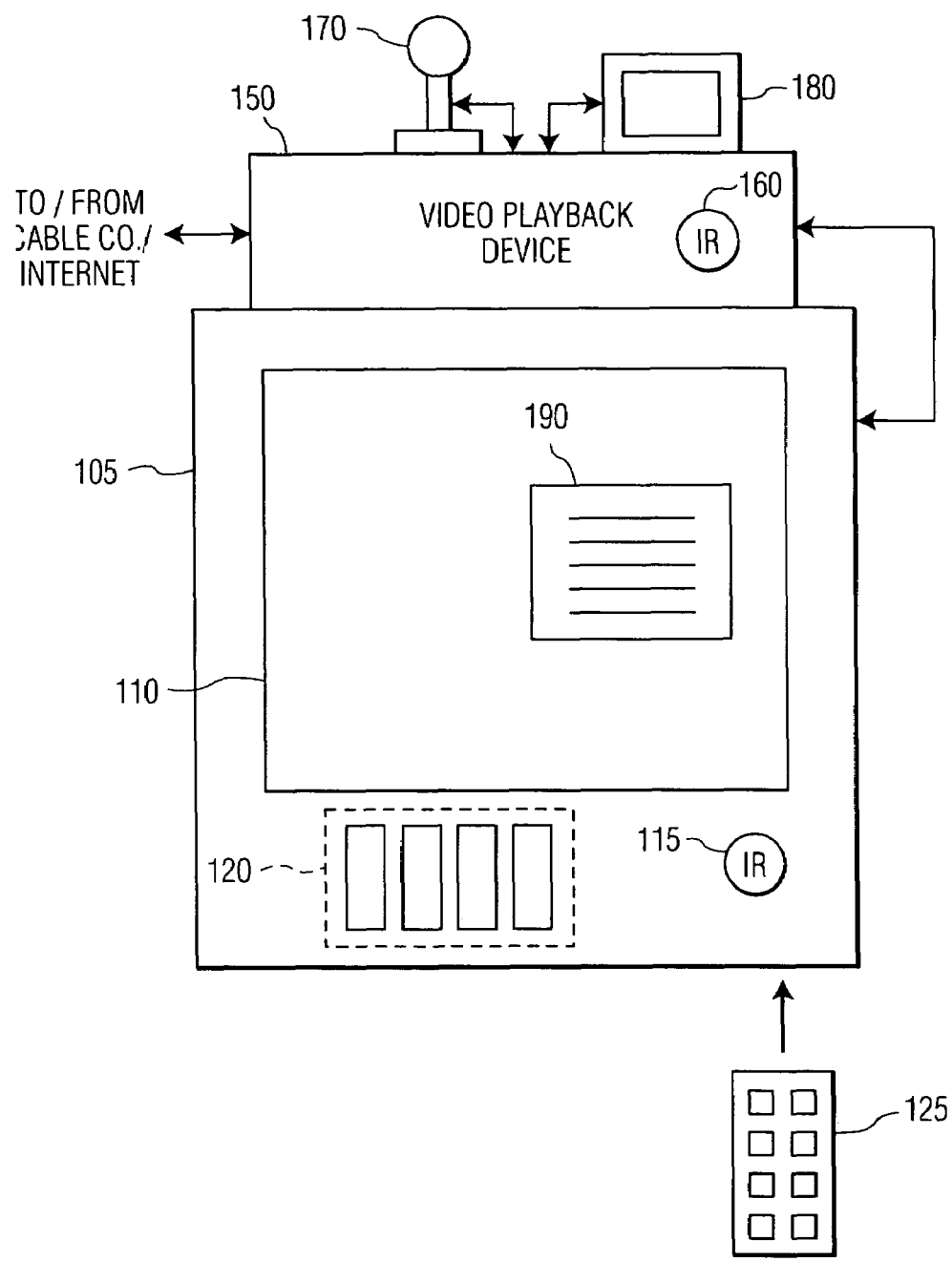
FIG. 2 illustrates an exemplary video display system according to an advantageous embodiment of the present invention.

FIG. 2 illustrates exemplary video playback device 150 and television set 105 according to an advantageous embodiment of the present invention. Video playback device 150 receives incoming television signals from local broadcast facility 11, which may be a cable television service provider (Cable Co.) or an Internet service provider (ISP). Video playback device 150 transmits television signals from a selected channel to television set 105. A channel may be selected manually by the user or may be selected automatically by a recording device previously programmed by the user. Alternatively, a channel and a video program may be selected automatically by a recording device based upon information from a program profile in the user's personal viewing history.

In Record mode, video playback device 150 may demodulate an incoming radio frequency (RF) television signal to produce a baseband video signal that is recorded and stored on a storage medium within or connected to video playback device 150. In Play mode, video playback device 150 reads a stored baseband video signal (i.e., a program) selected by the user from the storage medium and transmits it to television set 105. Video playback device 150 may comprise a video recorder of the type that is capable of receiving, recording, interacting with, and playing digital signals.

Video playback device 150 may comprise a video recorder of the type that utilizes recording tape, or that utilizes a hard disk, or that utilizes solid state memory, or that utilizes any other type of recording apparatus. If video playback device 150 is a video cassette recorder (VCR), video playback device 150 stores and retrieves the incoming television signals to and from a magnetic cassette tape. If video playback device 150 is a disk drive-based device, such as a ReplayTVJ recorder or a TiVOJ recorder, video playback device 150 stores and retrieves the incoming television signals to and from a computer magnetic hard disk rather than a magnetic cassette tape, and retrieves stored television signals from the hard disk. In still other embodiments, video playback device 150 may store and retrieve from a local read/write (R/W) digital versatile disk (DVD) or a read/write (R/W) compact disk (CD-RW). The local storage medium may be fixed (e.g., hard disk drive) or may be removable (e.g., DVD, CD-ROM).

Video playback device 150 comprises infrared (IR) sensor 160 that receives commands (such as Channel Up, Channel Down, Volume Up, Volume Down, Record, Play, Fast Forward (FF), Reverse, and the like) from remote control device 125 operated by the user. Television set 105 is a conventional television comprising screen 110, infrared (IR) sensor 115, and one or more manual controls 120 (indicated by a dotted line). IR sensor 115 also receives commands (such as Volume Up, Volume Down, Power On, Power Off) from remote control device 125 operated by the user.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. In some embodiments, video playback device 150 may not even be able to record, but may be limited to playing back television signals that are retrieved from a removable DVD or CD-ROM. Thus, the incoming signal may be a digital signal, an analog signal, or Internet protocol (IP) packets.

However, for purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Video playback device 150 also receives incoming audio messages from local broadcast facility 11, which may be a cable television service provider (Cable Co.) or an Internet service provider (ISP). As will be more fully described, video playback device 150 is capable of receiving audio messages from other users through local broadcast facility 11. Video playback device 150 is also capable of sending audio messages to other users through local broadcast facility 11.

As shown in FIG. 2, microphone 170 and speaker 180 are coupled to video playback device 150. The user speaks into microphone 170 to create an audio message. Microphone 170 provides the audio message to video playback device 150 to be sent to one or more other users at remote locations through local broadcast facility 11. Speaker 180 plays audio messages from other users at remote locations that have been received by video playback device 150 through local broadcast facility 11.

Figure 3:
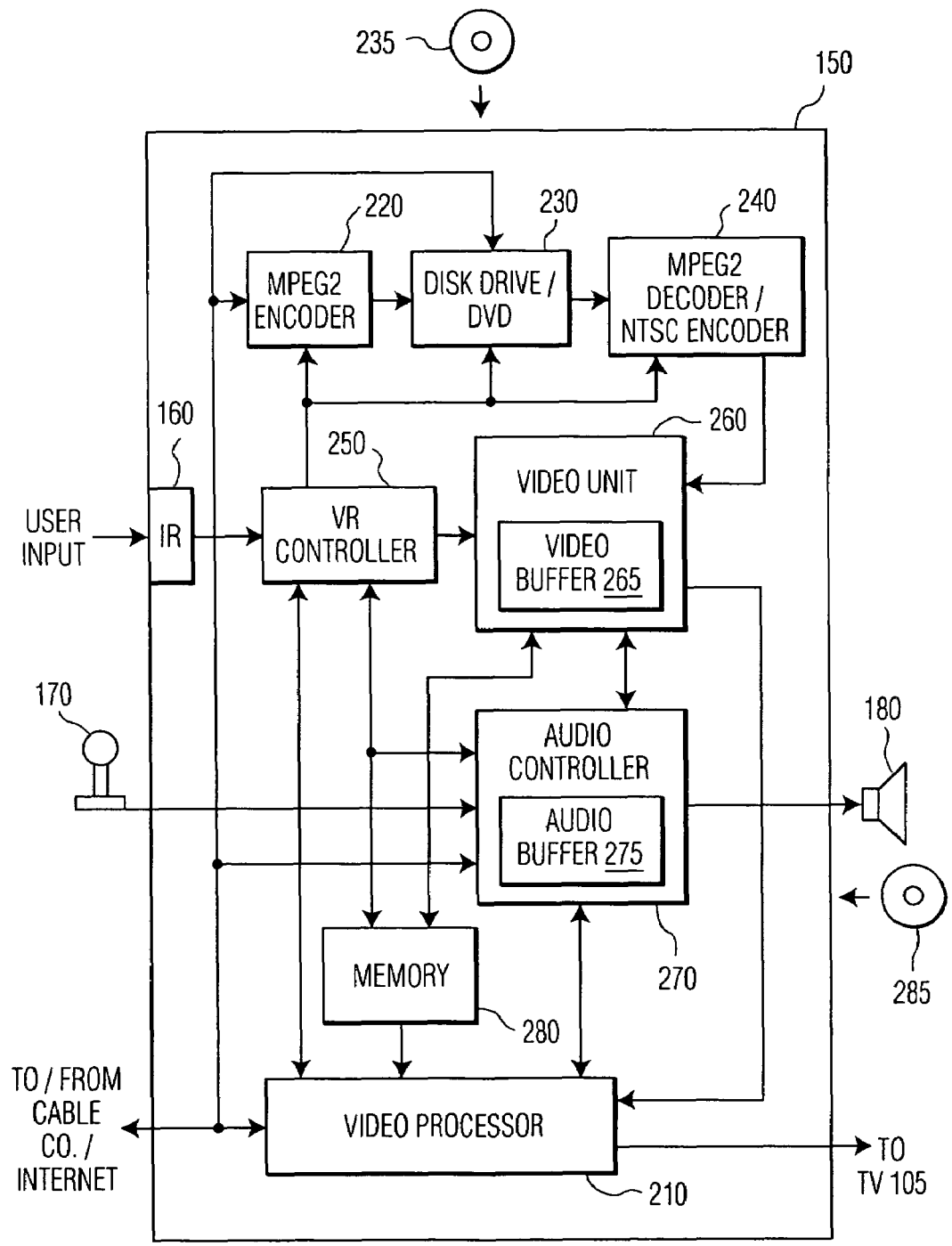
FIG. 3 illustrates a system for queuing and presenting audio messages in the exemplary video display system shown in FIG. 2 according to an advantageous embodiment of the present invention.

FIG. 3 illustrates exemplary video playback device 150 in greater detail according to an advantageous embodiment of the present invention. Video playback device 150 comprises IR sensor 160, video processor 210, MPEG2 encoder 220, hard disk drive 230, MPEG2 decoder/NTSC encoder 240, and video recorder (VR) controller 250. Video playback device 150 further comprises video unit 260 comprising video buffer 265, audio controller 270 comprising audio buffer 275, and memory 280. VR controller 250 directs the overall operation of video playback device 150, including View mode, Record mode, Play mode, Fast Forward (FF) mode, Reverse mode, and other similar functions. Audio controller 270 directs the creation, storage, and playing of audio messages in accordance with the principles of the present invention.

In View mode, VR controller 250 causes the incoming television signal from the cable service provider to be demodulated and processed by video processor 210 and transmitted to television set 105, with or without storing video signals on (or retrieving video signals from) hard disk drive 230. Video processor 210 contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 (after buffering in video buffer 265 of video unit 260) during Play mode and transmitting a baseband television signal to television set 105.

In Record mode, VR controller 250 causes the incoming television signal to be stored on hard disk drive 230. Under the control of VR controller 250, MPEG2 encoder 220 receives an incoming analog television signal from the cable service provider and converts the received RF signal to the MPEG2 format for storage on hard disk drive 230. Alternatively, if video playback device 150 is coupled to a source that is transmitting MPEG2 data, the incoming MPEG2 data may bypass MPEG2 encoder 220 and be stored directly on hard disk drive 230.

In Play mode, VR controller 250 directs hard disk drive 230 to stream the stored television signal (i.e., a program) to MPEG2 decoder/NTSC encoder 240, which converts the MPEG2 data from hard disk drive 230 to, for example, a super video (S-Video) signal that video processor 210 transmits to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards, or with one or more other types of standards.

For the purposes of this application and the claims that follow, hard disk drive 230 is defined to include any mass storage device that is both readable and writable, including, but not limited to, conventional magnetic disk drives and optical disk drives for read/write digital versatile disks (DVD-RW), re-writable CD-ROMs, VCR tapes and the like. In fact, hard disk drive 230 need not be fixed in the conventional sense that it is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or attached), such as a juke box device (not shown) that holds several read/write DVDs or re-writable CD-ROMs. As illustrated schematically in FIG. 2, removable disk drives of this type are capable of receiving and reading re-writable CD-ROM disk 235.

Furthermore, in an advantageous embodiment of the present invention, hard disk drive 230 may include external mass storage devices that video playback device 150 may access and control via a network connection (e.g., Internet protocol (IP) connection), including, for example, a disk drive in the viewer's home personal computer (PC) or a disk drive on a server at the viewer's Internet service provider (ISP).

VR controller 250 obtains information from video processor 210 concerning video signals that are received by video processor 210. When VR controller 250 determines that video playback device 150 is receiving a video program, VR controller 250 determines if the video program is one that has been selected to be recorded. If the video program is to be recorded, then VR controller 250 causes the video program to be recorded on hard disk drive 230 in the manner previously described. If the video program is not to be recorded, then VR controller 250 causes the video program to be processed by video processor 210 and transmitted to television set 105 in the manner previously described.

In an exemplary embodiment of the present invention, memory 280 may comprise random access memory (RAM) or a combination of random access memory (RAM) and read only memory (ROM). Memory 280 may comprise a non-volatile random access memory (RAM), such as flash memory. In an alternate advantageous embodiment of television set 105, memory 280 may comprise a mass storage data device, such as a hard disk drive (not shown). Memory 280 may also include an attached peripheral drive or removable disk drives (whether embedded or attached) that reads read/write DVDs or re-writable CD-ROMs. As illustrated schematically in FIG. 2, removable disk drives of this type are capable of receiving and reading re-writable CD-ROM disk 285.

Figure 4:
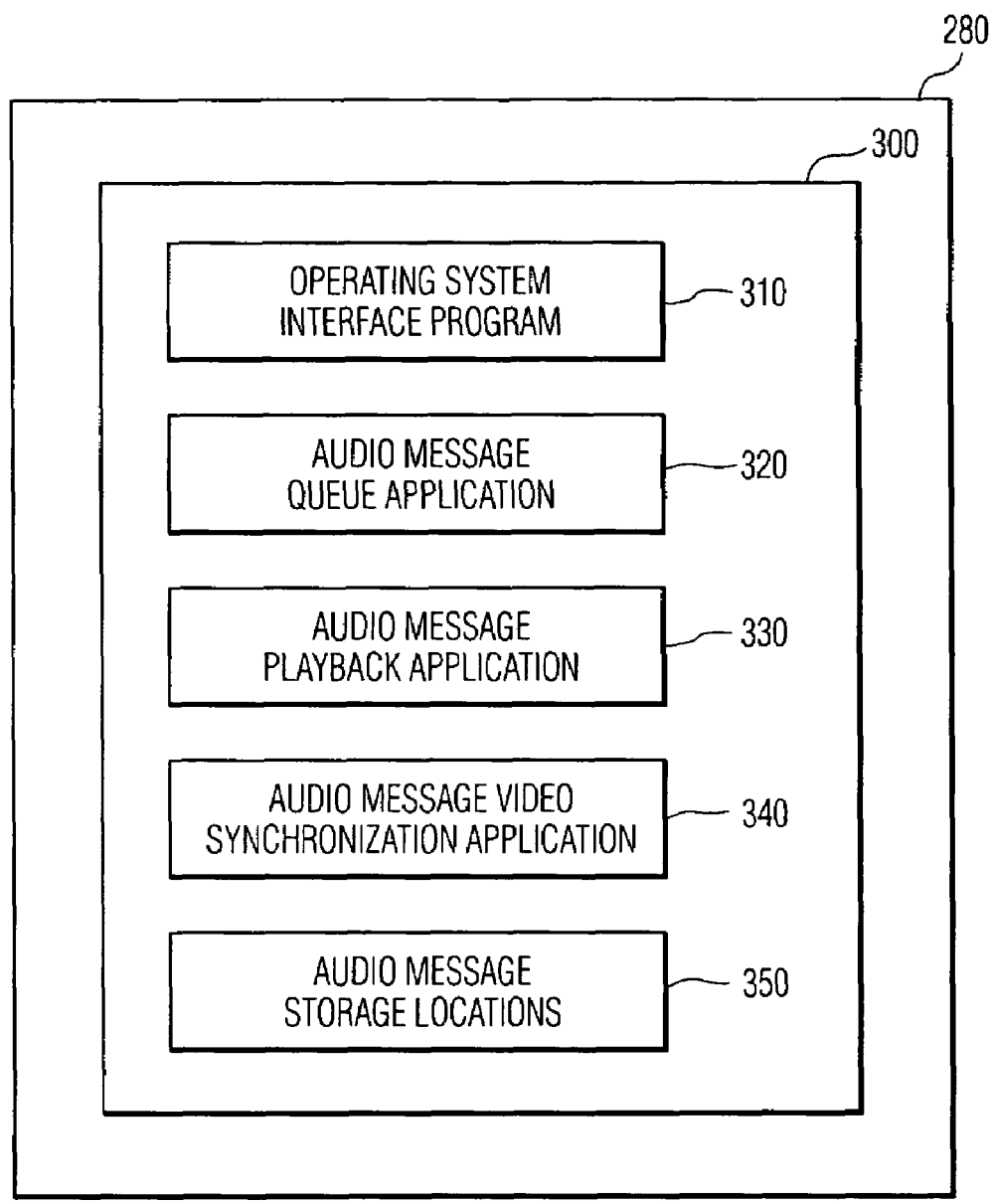
FIG. 4 illustrates audio message computer software used with an advantageous embodiment of the present invention.

FIG. 4 illustrates a selected portion of memory 280 that contains audio message software 300 of the present invention. Memory 280 contains operating system interface program 310, audio message queue application 320, audio message playback application 330, audio message video synchronization application 340, and audio message storage locations 350. Audio controller 270 and audio message software 300 together comprise an audio message control system that is capable of carrying out the present invention. Operating system interface program 310 coordinates the operation of audio message software 300 with the operating system of VR controller 250 and audio controller 270.

Assume that audio controller 270 receives an audio message from a remote user through local broadcast facility 11. Audio controller 270 can immediately play the audio message through speaker 180. Now assume that audio controller 270 receives a first audio message from a first remote user and a second audio message from a second remote user. Assume that the two audio messages arrive at audio controller 270 simultaneously (or nearly simultaneously so that there is significant overlap of the two audio messages). If audio controller 270 immediately plays the two is audio messages through speaker 180, then the user will hear the two messages at substantially the same time. The effect will be as if the first remote user and the second remote user were talking at the same time.

Audio controller 270 of the present invention solves this problem by buffering the audio messages in audio buffer 265 and playing them out sequentially, either under program control or user control. Under the direction of instructions in audio control software 300 stored within memory 280, audio controller 270 is capable of (1) receiving audio messages that arrive simultaneously (or nearly simultaneously so that there is significant overlap of two or more audio messages), (2) placing the audio messages that are received in an audio message queue, (3) sequentially playing the audio messages in the audio message queue in the order in which the audio messages arrived, (4) in response to a user input, sequentially playing the audio messages in the audio message queue at a time selected by the user, and (5) in response to a user input, sequentially playing the audio messages in the audio message queue in an order selected by the user.

In one advantageous embodiment of the present invention, audio controller 270 places each audio message that is received in a "first in, first out" (FIFO) queue in audio buffer 275. Audio controller 270 accomplishes this by executing computer instructions in audio message queue application 320. Audio controller 270 then plays each audio message sequentially through speaker 180 in the order in which the audio messages arrived at audio controller 270. Audio controller 270 accomplishes this by executing computer instructions in audio message playback application 330. Audio controller 270 waits for a period of time (referred to as an "audio message time delay") after each message is played before playing the next audio message. The length of the audio message time delay may be set by the user by sending an appropriate control signal to audio controller 270 using remote control device 125 and IR sensor 160.

In an alternate advantageous embodiment of the present invention, audio controller 270 places each audio message that is received in a "first in, first out" (FIFO) queue in audio buffer 275. Audio controller 270 accomplishes this by executing computer instructions in audio message queue application 320. Audio controller 270 then plays each audio message sequentially through speaker 180 in the order in which the audio messages arrived at audio controller 270. Audio controller 270 accomplishes this by executing computer instructions in audio message playback application 330. In this alternate advantageous embodiment of the present invention, after each audio message is played, audio controller 270 waits to receive a "play next" control signal from the user after each message is played before playing the next audio message. The user sends the "play next" control signal to audio controller 270 using remote control device 125 and IR sensor 160.

In another alternate advantageous embodiment of the present invention, audio controller 270 places each audio message that is received in a "first in, first out" (FIFO) queue in audio buffer 275. Audio controller 270 accomplishes this by executing computer instructions in audio message queue application 320. Audio controller 270 then plays each audio message sequentially through speaker 180 in the order in which the audio messages are selected by the user. Audio controller 270 accomplishes this by executing computer instructions in audio message playback application 330.

Each user is assigned a screen name by audio message coordinator 60 in local broadcast facility 11. The user's screen name is associated with each audio message to identify the user who originated the audio message. In this alternate advantageous embodiment of the present invention, audio controller 270 sends the screen name for each audio message to video unit 260 and a control signal to VR controller 250. In response to the control signal from audio controller 270, VR controller 250 causes video unit 260 and video processor 210 to display on screen 110 of television set 105 a list 190 that contains the screen names of the senders of the audio messages.

List 190 displays (1) all the audio messages that have been received and (2) the identity of the user that sent each audio message. Using remote control device 125 and IR sensor 160, the user sends a "play audio message" control signal to audio controller 270 to select which audio message in list 190 to play next. In this manner the user selects the order in which the audio messages are played. The user also selects how much time elapses before sending the next "play audio message" control signal. This allows the user to control the time delay between the playing of the audio messages.

When the user desires to send an audio message to a remote user the user speaks the audio message into microphone 170. Microphone 170 provides the audio message to audio controller 270 and audio controller 270 sends the audio message to audio message coordinator 60 in local broadcast facility 11. Audio message coordinator 60 obtains the originating user's screen name from audio message database 70. Audio message coordinator 60 then sends the originating user's audio message and the originating user's screen name to the remote user (i.e., the user to whom the audio message is directed). The remote user can then access the audio message using any one of the three methods described above.

It is possible that two or more users may exchange audio messages that relate to a video program that they are both watching simultaneously. A system for viewing video programs simultaneously is disclosed in U.S. patent application Ser. No. 09/010,306 filed on Jun. 28, 2001, entitled "SYNCHRONIZED PERSONAL VIDEO RECORDERS." This patent application is commonly assigned to the assignee of the present invention. The disclosure of this related patent application is hereby incorporated herein by reference for all purposes as if fully set forth herein.

Assume that a first user sends to a second user an audio message that relates to an event in the video program that both the first user and the second user are watching. Any delay in playing the audio message will cause the audio message to be out of synchrony with the video program. For example, assume that the first user and the second user are both watching a video program of a baseball game. The first user sends an audio message to the second user that states: "Watch the replay of the home run!" If the audio message is held in the audio message queue for some time (e.g., fifteen seconds) while other audio messages are being played, then the audio message concerning the home run will not be synchronized with the video portion that shows the home run when the audio message finally arrives. The home run portion of the video program that the audio message refers to will have already passed by.

The present invention provides a system and method for solving this synchronization problem by linking the audio message with a portion of the video program to which the audio message refers. In an advantageous embodiment of the present invention, audio controller 270 receives an audio message from the first user through microphone 170. Audio controller 270 immediately accesses video unit 260 to obtain a timestamp of the video program that is being displayed. The timestamp of the video program may then be used to associate the audio message with the portion of the video program that is being displayed. Alternatively, audio controller 270 can access video unit 260 to obtain a "fingerprint" of the frame in the video program that relates to the time when the audio message was received from microphone 170. The timestamp or the "fingerprint" of the frame temporally correlates the audio message with the video program. Audio controller 270 accomplishes this by executing computer instructions in audio message video synchronization application 340.

Audio controller 270 then sends the audio message and the timestamp information to audio message coordinator 60 of local broadcast facility 11 for forwarding to the remote user or users. The audio controller 270 at the site of the remote user reads the timestamp information and sends a control signal to video unit 260 at the site of the remote user to replay the video portion beginning at the time indicated by the timestamp. Alternatively, a predetermined amount of time may be subtracted from the time indicated by the timestamp so that the video program is replayed from a time that occurs slightly before the time indicated by the timestamp. This may be done to provide some "lead in" portion of video to serve as "preparation" or "background" for the video portion that is associated with the audio message.

When the video portion associated with the timestamp is displayed on television set 105 at the remote site, the audio message is simultaneously played on speaker 180 at the remote site. This allows the remote user to hear the audio message synchronously with the video portion associated with the audio message.

An alternate advantageous embodiment of the present invention is directed to cases in which one or more remote users are not capable of simultaneously accessing the same video program as the originating user. In this alternate advantageous embodiment, audio controller 270 uses timestamps to associate one or more audio messages with a video program in video buffer 265. Audio controller 270 then sends control signals to video unit 260 to cause the entire video program (together with the associated audio messages) to be sent to the remote users through local broadcast facility 11. The remote users can then either (1) play the video file (with the associated audio messages) as the video file is received, or (2) record the video file (with the associated audio messages) to be played at a later time. This allows the remote users to view the video program and hear the originating user's audio messages as "voice over" annotations to the video program.

In another alternate advantageous embodiment of the present invention, audio controller 270 is capable of sending one or more audio messages batched as part of a mail message.

Figure 5:
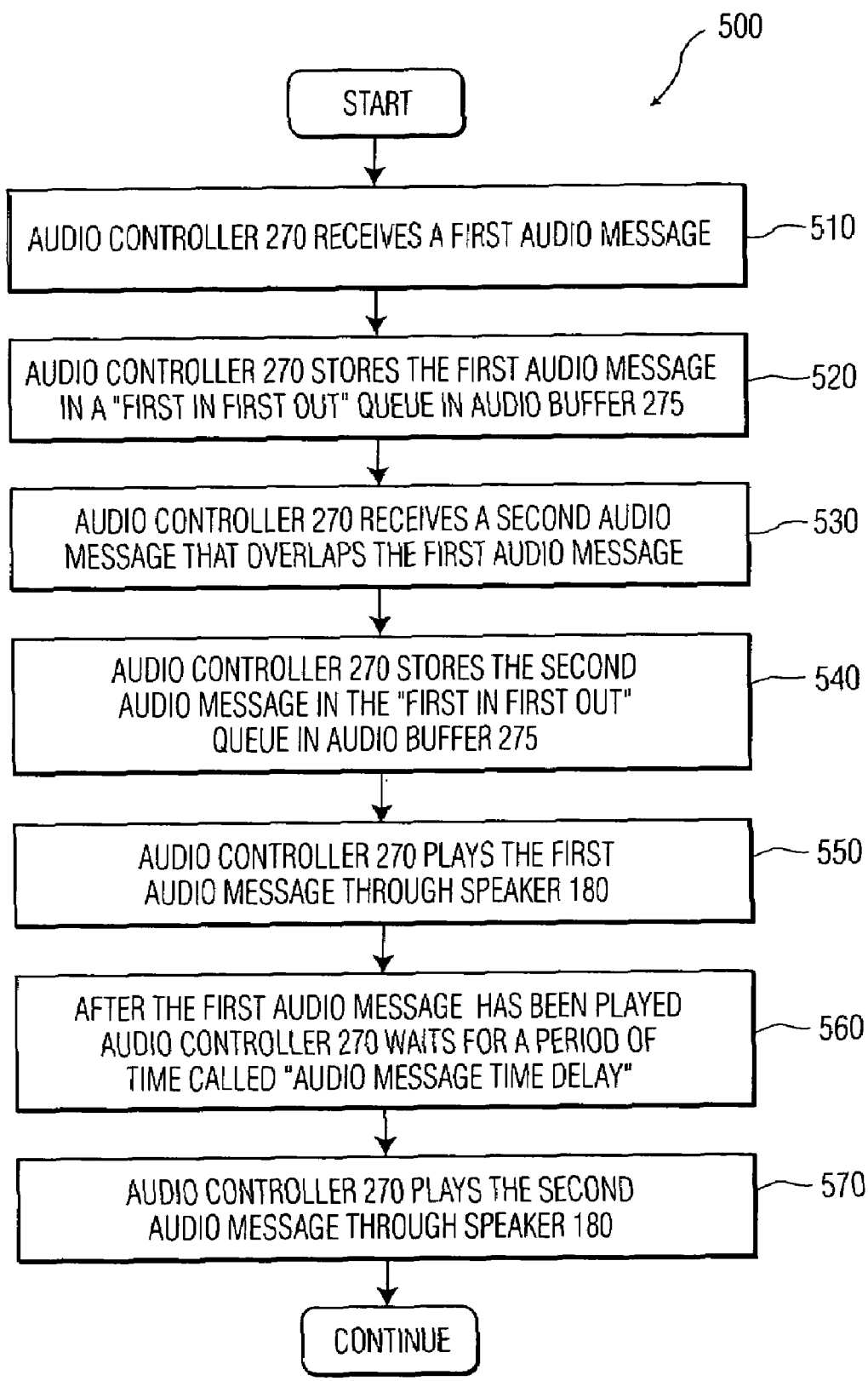
FIG. 5 illustrates a flow diagram of the operation of a method of an advantageous embodiment of the present invention for queuing and presenting audio messages.

FIG. 5 depicts flow diagram 500 illustrating the operation of the method of an advantageous embodiment of the present invention for queuing and presenting audio messages. In the first step of the method audio controller 270 receives a first audio message (step 510). Audio controller 270 then stores the first audio message in a "first in, first out" queue in audio buffer 275 (step 520). Audio controller 270 then receives a second audio message that overlaps the first audio message (step 530). Audio controller 270 stores the second audio message in a "first in, first out" queue in audio buffer 275 (step 540).

Audio controller 270 then plays the first audio message through speaker 180 (step 550). After the first audio message has been played, audio controller 270 waits for a period of time called "audio message time delay" (step 560). Audio controller 270 then plays the second audio message through speaker 180.

Figure 6:
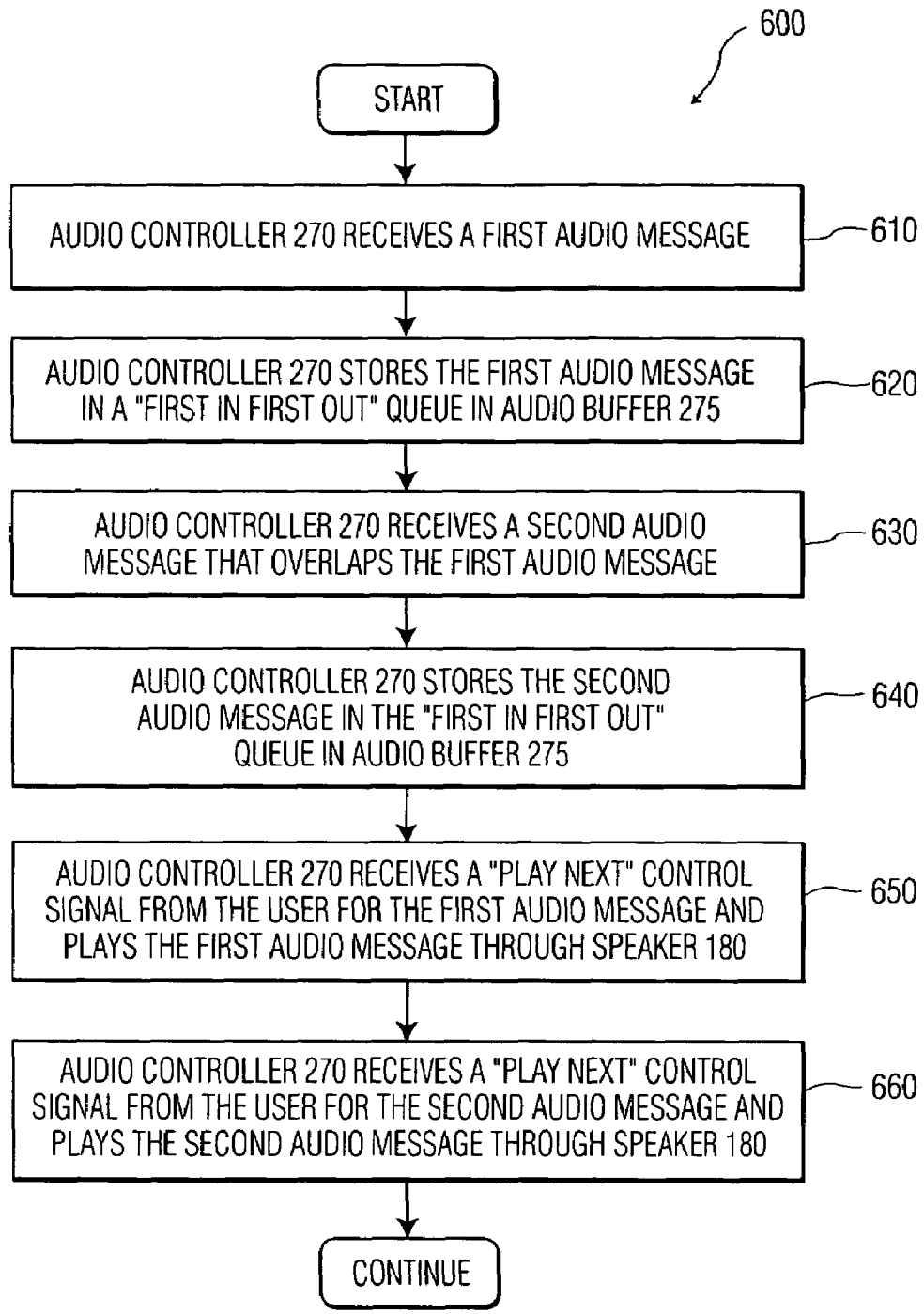
FIG. 6 illustrates a flow diagram of the operation of an alternate method of an advantageous embodiment of the present invention for queuing and presenting audio messages.

FIG. 6 depicts flow diagram 600 illustrating the operation of an alternate method of an advantageous embodiment of the present invention for queuing and presenting audio messages. In the first step of the method audio controller 270 receives a first audio message (step 610). Audio controller 270 then stores the first audio message in a "first in, first out" queue in audio buffer 275 (step 620). Audio controller 270 then receives a second audio message that overlaps the first audio message (step 630). Audio controller 270 stores the second audio message in a "first in, first out" queue in audio buffer 275 (step 640).

Audio controller 270 then receives a "play next" control signal from the user for the first audio message and plays the first audio message through speaker 180 (step 650). Audio controller 270 then receives a "play next" control signal from the user for the second audio message and plays the second audio message through speaker 180 (step 660).

Figure 7:
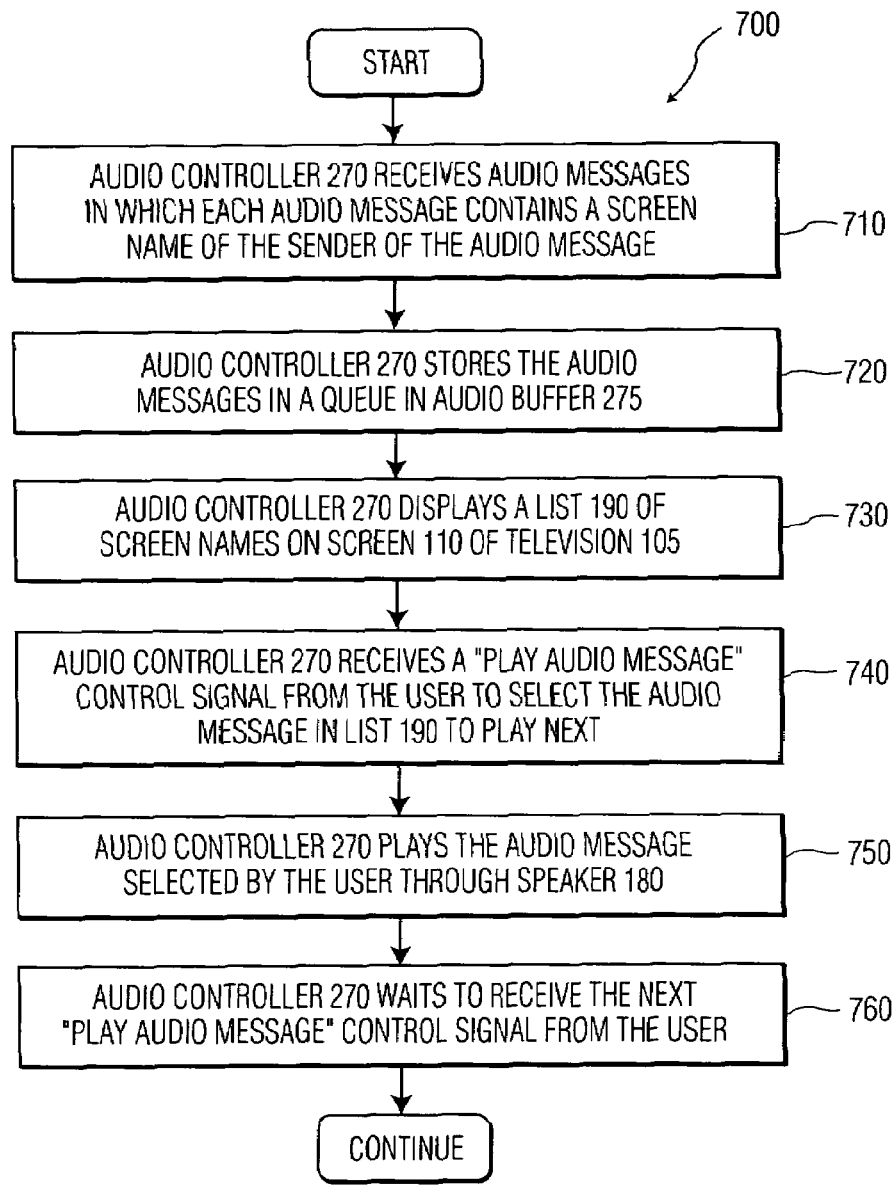
FIG. 7 illustrates a flow diagram of the operation of an alternate method of an advantageous embodiment of the present invention for queuing and presenting audio messages.

FIG. 7 depicts flow diagram 700 illustrating the operation of an alternate method of an advantageous embodiment of the present invention for queuing and presenting audio messages. In the first step of the method audio controller 270 receives audio messages in which each audio message contains a screen name of the sender of the message (step 710). Audio controller 270 stores the audio messages in a queue in audio buffer 275 (step 720). Audio controller 270 then displays a list 190 of screen names on screen 110 of television set 105 (step 730).

Audio controller 270 receives a "play audio message" control signal from the user to select the audio message in list 190 to play next (step 740). Audio controller 270 then plays the audio message selected by the user through speaker 180 (step 750). Audio controller 270 then waits to receive the next "play audio message" control signal from the user (step 760).

Figure 8:
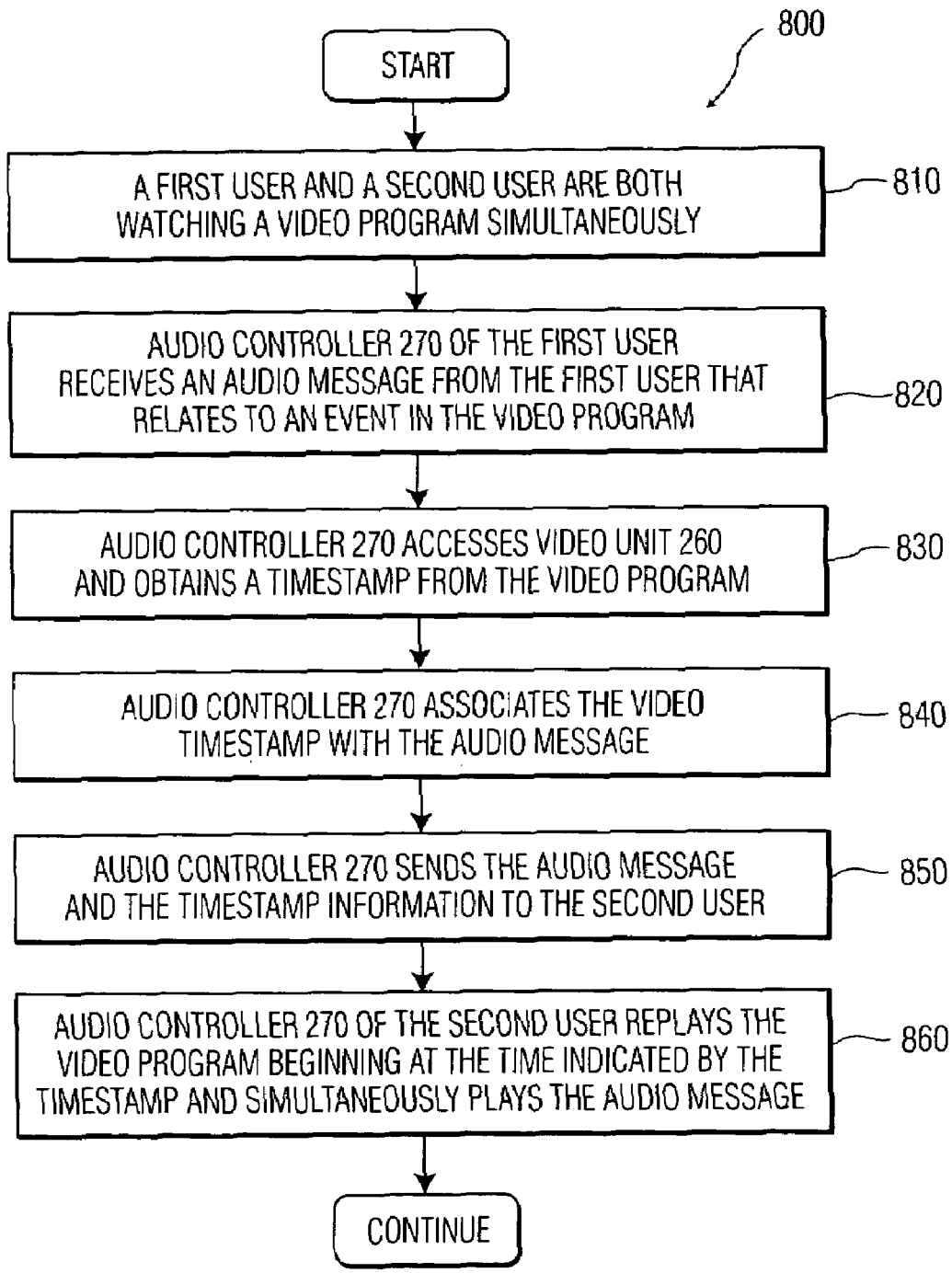
FIG. 8 illustrates a flow diagram of the operation of an alternate method of an advantageous embodiment of the present invention for queuing and presenting audio messages.

FIG. 8 depicts flow diagram 800 illustrating the operation of an alternate method of an advantageous embodiment of the present invention for queuing and presenting audio messages. In the first step of the method a first user and a second user are both watching a video program simultaneously (step 810). Audio controller 270 of the first user receives an audio message from the first user that relates to an event in the video program (step 820). Audio controller 270 accesses video unit 260 and obtains a timestamp from the video program (step 830).

Audio controller 270 associates the video timestamp with the audio message (step 840). Audio controller 270 then sends the audio message and the timestamp information to the second user (step 850). Audio controller 270 of the second user then replays the video program beginning at the time indicated by the timestamp and simultaneously plays the audio message (step 860).

Although the present invention has been described in detail, those skilled in the art should understand that they can make various changes, substitutions and alterations herein without departing from the spirit and scope of the invention in its broadest form.

What is claimed is:

1. An apparatus in a communication system for playing audio messages
    received in said communication system n synchronicity with an independent video signal received in said communication system, said apparatus comprising:
    an audio controller capable of receiving a plurality of audio messages:
    an audio message coordinator that communicates bidirectionally with the audio controller in order to receive audio messages from the audio controller and distribute audio messages to the audio controller; and
    an audio buffer associated with said audio controller, said audio buffer capable of storing said plurality of audio messages received by said audio controller;

wherein said audio controller is capable of playing each of said plurality of audio messages stored in said audio buffer in synchronicity with the display of the independent video signal;

wherein said audio controller is capable of separately storing within said audio buffer overlapping audio messages that have portions that have been simultaneously received by said audio controller; and wherein said audio controller is capable of sequentially playing each of said separately stored overlapping audio messages.

2. The apparatus as claimed in claim 1 wherein said audio controller is capable of storing said plurality of audio messages in a first in, first out queue in said audio buffer.

3. The apparatus as claimed in claim 1 wherein said audio controller is capable of waiting for a period of time before said audio controller plays an audio message that is stored in said audio buffer.

4. The apparatus as claimed in claim 1 wherein said audio controller is capable of receiving a play next control signal from a user before said audio controller plays an audio message that is stored in said audio buffer.

5. The apparatus as claimed in claim 1 wherein said audio controller is capable of receiving a plurality of audio messages in which each audio message contains a screen name of a sender of said audio message;

wherein said audio controller is capable of displaying a list of screen names from said plurality of audio messages for a user to select an audio message to be played next;

wherein said audio controller is capable of receiving a play audio message control signal from said user that indicates an audio message to be played next; and wherein said audio controller is capable of playing said audio message selected by said user.

6. The apparatus as claimed in claim 1 wherein said audio controller is capable of receiving an audio message from a first user to be sent to a second user in which said independent video signal is a video program that the first user and the second user are watching simultaneously;

wherein said audio controller is capable of accessing a video unit of said communication system to obtain a timestamp of said video program when said audio controller receives said audio message from said first user;

wherein said audio controller is capable of associating said timestamp of said video program with said audio message; and wherein said audio controller is capable of sending said audio message and said associated timestamp to said second user.

7. A communication system capable of playing audio messages received in said communication system in synchronicity with an independent video signal received in said communication system, said communication system comprising:

an audio controller capable of receiving a plurality of audio messages;

an audio message coordinator that communicates bidirectionally with the audio controller in order to receive audio messages from the audio controller and distribute audio messages to the audio controller; and an audio buffer associated with said audio controller, said audio buffer capable of storing said plurality of audio messages received by said audio controller;

wherein said audio controller is capable of playing each of said plurality of audio messages stored in said audio buffer in synchronicity with the display of the independent video signal;

wherein said audio controller is capable of separately storing within said audio buffer overlapping audio messages that have portions that have been simultaneously received by said audio controller; and wherein said audio controller is capable of sequentially playing each of said separately stored overlapping audio messages.

8. The communication system as claimed in claim 7 wherein said audio controller is capable of storing said plurality of audio messages in a first in, first out queue in said audio buffer.

9. The communication system as claimed in claim 7 wherein said audio controller is capable of waiting for a period of time before said audio controller plays an audio message that is stored in said audio buffer.

10. The communication system as claimed in claim 7 wherein said audio controller is capable of receiving a play next control signal from a user before said audio controller plays an audio message that is stored in said audio buffer.

11. The communication system as claimed in claim 7 wherein said audio controller is capable of receiving a plurality of audio messages in which each audio message contains a screen name of a sender of said audio message;

wherein said audio controller is capable of displaying a list of screen names from said plurality of audio messages for a user to select an audio message to be played next;

wherein said audio controller is capable of receiving a play audio message control signal from said user that indicates an audio message to be played next; and wherein said audio controller is capable of playing said audio message selected by said user.

12. The communication system as claimed in claim 7 wherein said audio controller is capable of receiving an audio message from a first user to be sent to a second user in which said independent video signal is a video program that the first user and the second user are watching simultaneously;

wherein said audio controller is capable of accessing a video unit of said communication system to obtain a timestamp of said video program when said audio controller receives said audio message from said first user;

wherein said audio controller is capable of associating said timestamp of said video program with said audio message; and wherein said audio controller is capable of sending said audio message and said associated timestamp to said second user.

13. A method for playing audio messages that are received in a communication system in synchronicity with an independent video signal received in said communication system, said method comprising the steps of:

receiving a plurality of messages in an audio message coordinator;

distributing said plurality of messages to an audio controller;

receiving said plurality of audio messages in said audio controller;

storing said plurality of audio messages received by said audio controller in an audio buffer associated with said audio controller;

separately storing within said audio buffer overlapping audio messages that have portions that have been simultaneously received by said audio controller; and sequentially playing each of said separately stored overlapping audio messages in synchronicity with the display of the independent video signal.

14. The method as claimed in claim 13 further comprising the step of:

storing said plurality of audio messages in a first in, first out queue in said audio buffer.

15. The method as claimed in claim 13 further comprising the step of:

waiting for a period of time before said audio controller plays an audio message that is stored in said audio buffer.

16. The method as claimed in claim 13 further comprising the step of:

receiving in said audio controller a play next control signal from a user before said audio controller plays an audio message that is stored in said audio buffer.

17. The method as claimed in claim 13 further comprising the steps of:

receiving in said audio controller a plurality of audio messages in which each audio message contains a screen name of a sender of said audio message;

displaying a list of screen names from said plurality of audio messages for a user to select an audio message to be played next;

receiving in said audio controller a play audio message control signal from said user that indicates an audio message to be played next; and playing said audio message selected by said user.

18. The method as claimed in claim 13 further comprising the steps of:

receiving in said audio controller an audio message from a first user to be sent to a second user in which said independent video signal is a video program that the first user and the second user are watching simultaneously;

accessing a video unit of said communication system with said audio controller to obtain a timestamp of said video program when said audio controller receives said audio message from said first user;

associating said timestamp of said video program with said audio message in said audio controller; and sending said audio message and said associated timestamp to said second user from said audio controller.

19. Computer-executable instructions stored on a computer-readable storage medium for playing audio messages that are received in a communication system in synchronicity with an independent video signal received in said communication system, said computer-executable instructions comprising the steps of:

receiving a plurality of messages in an audio message coordinator;

distributing said plurality of messages to an audio controller;

receiving said plurality of audio messages in said audio controller;

storing said plurality of audio messages received by said audio controller in an audio buffer associated with said audio controller;

separately storing within said audio buffer overlapping audio messages that have portions that have been simultaneously received by said audio controller; and sequentially playing each of said separately stored overlapping audio messages in synchronicity with the display of the independent video signal.

20. The computer-executable instructions stored on a computer-readable storage medium as claimed in claim 19 wherein said computer-executable instructions further comprise the step of:

storing said plurality of audio messages n a first in, first out queue in said audio buffer.

21. The computer-executable instructions stored on a computer-readable storage medium as claimed in claim 19 wherein said computer-executable instructions further comprise the step of:

waiting for a period of time before said audio controller plays an audio message that is stored in said audio buffer.

22. The computer-executable instructions stored on a computer-readable storage medium as claimed in claim 19 wherein said computer-executable instructions further comprise the step of:

receiving in said audio controller a play next control signal from a user before said audio controller plays an audio message that is stored in said audio buffer.

23. The computer-executable instructions stored on a computer-readable storage medium as claimed in claim 19 wherein said computer-executable instructions further comprise the steps of:

receiving in said audio controller a plurality of audio messages in which each audio message contains a screen name of a sender of said audio message; displaying a list of screen names from said plurality of audio messages for a user to select an audio message to be played next;

receiving in said audio controller a play audio message control signal from said user that indicates an audio message to be played next; and playing said audio message selected by said user.

24. The computer-executable instructions stored on a computer-readable storage medium as claimed in claim 19 wherein said computer-executable instructions further comprise the steps of:

receiving in said audio controller an audio message from a first user to be sent to a second user in which said independent video signal is a video program that the first user and the second user are watching simultaneously;

accessing a video unit of said communication system with said audio controller to obtain a timestamp of said video program when said audio controller receives said audio message from said first user;

associating said timestamp of said video program with said audio message in said audio controller; and sending said audio message and said associated timestamp to said second user from said audio controller.

* * * * *